United States Patent
Wu et al.

(10) Patent No.: US 8,247,103 B2
(45) Date of Patent: Aug. 21, 2012

(54) BATTERY COVER MECHANISM

(75) Inventors: Xi-Qiu Wu, Shenzhen (CN);
Guang-Xiang Zhang, Shenzhen (CN);
Cong-Ling Xiao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 437 days.

(21) Appl. No.: 12/558,741

(22) Filed: Sep. 14, 2009

(65) Prior Publication Data
US 2010/0119923 A1  May 13, 2010

(30) Foreign Application Priority Data
Nov. 12, 2008 (CN) .......................... 2008 1 0305490

(51) Int. Cl.
*H01M 2/10* (2006.01)
(52) U.S. Cl. .......... 429/97; 429/100; 429/163; 429/175; 429/176
(58) Field of Classification Search .................... 429/97, 429/100, 163, 175, 176
See application file for complete search history.

(56) References Cited

U.S. PATENT DOCUMENTS

| | | | | |
|---|---|---|---|---|
| 1,332,868 A * | 3/1920 | Frankel | ........................... | 362/205 |
| 7,488,555 B2 * | 2/2009 | Chen et al. | .................... | 429/100 |
| 7,638,231 B2 * | 12/2009 | Kurosawa | ........................ | 429/97 |
| 7,700,224 B2 * | 4/2010 | Tsumura et al. | ............... | 429/100 |
| 7,713,657 B2 * | 5/2010 | Yamasaki et al. | ............. | 429/178 |
| 7,833,652 B2 * | 11/2010 | Nagano | ........................... | 429/97 |
| 7,838,142 B2 * | 11/2010 | Scheucher | ....................... | 429/99 |
| 7,914,919 B2 * | 3/2011 | Wang | ............................. | 429/100 |
| 7,917,185 B2 * | 3/2011 | Shi et al. | ..................... | 455/575.8 |
| 8,010,170 B2 * | 8/2011 | Shi et al. | ..................... | 455/575.1 |
| 8,025,994 B2 * | 9/2011 | Nishimaki et al. | ............... | 429/96 |
| 2009/0061296 A1 * | 3/2009 | Lee | ................ | 429/100 |
| 2009/0286144 A1 * | 11/2009 | Wu | ................ | 429/100 |
| 2010/0035136 A1 * | 2/2010 | Huang et al. | .................. | 429/100 |
| 2010/0086839 A1 * | 4/2010 | Wu et al. | ......................... | 429/97 |
| 2010/0086840 A1 * | 4/2010 | Shao | ................................ | 429/97 |
| 2010/0112426 A1 * | 5/2010 | Wu et al. | ....................... | 429/100 |
| 2010/0124697 A1 * | 5/2010 | Chen et al. | ...................... | 429/97 |
| 2010/0124698 A1 * | 5/2010 | Wu et al. | ....................... | 429/100 |
| 2010/0245659 A1 * | 9/2010 | Nam | .............................. | 348/372 |
| 2010/0330407 A1 * | 12/2010 | Lee | ................ | 429/97 |
| 2011/0020681 A1 * | 1/2011 | Liu | ................ | 429/97 |
| 2011/0020684 A1 * | 1/2011 | Liang et al. | .................. | 429/100 |

\* cited by examiner

*Primary Examiner* — Robert Hodge
(74) *Attorney, Agent, or Firm* — Altis Law Group, Inc.

(57) ABSTRACT

A battery cover mechanism for a portable electronic device includes a housing, a door, two first elastic members and a holding unit, the housing defines a cutout, the door slidably engage with the cutout, the cutout is closed by the door with the elastic resisting the door, the door can be opened by external force and not be removed from the housing, thus, a battery can be assembled in the housing.

15 Claims, 4 Drawing Sheets

BATTERY COVER MECHANISM

CROSS-REFERENCE TO RELATED APPLICATION

This application is related to co-pending U.S. patent application Ser. No. 12/558,740, entitled "BATTERY COVER MECHANISM", by XI-QIU WU et al., which is the same assignee as the present application. The above-identified application is incorporated herein by reference.

BACKGROUND

1. Field of the Invention

The disclosure relates to battery cover mechanisms, particularly to a battery cover mechanism used in portable electronic devices.

2. Description of Related Art

Portable electronic devices such as mobile phones and personal digital assistants (PDAs) are widely used. When a battery is installed in the portable electronic device, the battery is generally shielded and fixed in place by a battery cover mechanism.

A commonly used battery cover mechanism includes a cover and a housing. The cover includes a pin at on one end and a protrusion at an opposite end. The housing defines a receiving hole and a holding aperture. The protrusion can be received in the holding aperture, and the cover impelled towards the housing until the pin is received into the receiving hole. As such, the cover securely engages the housing by protrusion seated in the holding aperture. However, the cover usually needs to be separated from the housing for removing a battery from the housing. Therefore, the cover may be easily lost.

Therefore, there is room for improvement within the art.

BRIEF DESCRIPTION OF THE DRAWINGS

Many aspects of the present battery cover mechanism can be better understood with reference to the following drawings. The components in the various drawings are not necessarily drawn to scale, the emphasis instead being placed upon clearly illustrating the principles of the present battery cover mechanism. Moreover, in the drawings, like reference numerals designate corresponding parts throughout the diagrams.

DETAILED DESCRIPTION OF THE EMBODIMENT

Figure 1:
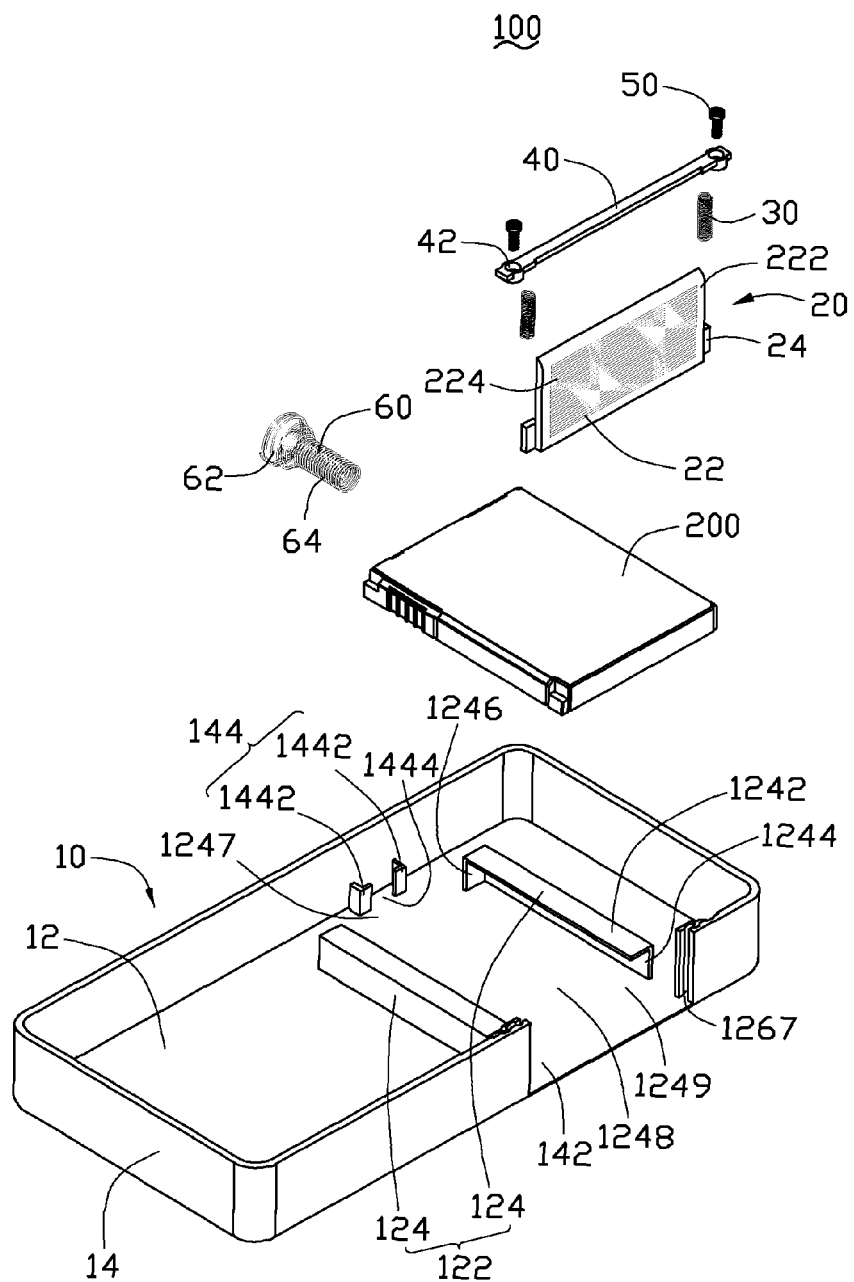
FIG. 1 is a disassembled view of the battery cover mechanism as disclosed.

Referring to FIG. 1, the battery cover mechanism 100 can be applied in mobile phones and other portable electronic devices such as personal digital assistants (PDAs), digital cameras, and others, for receiving a battery 200. The battery cover mechanism 100 includes a housing 10, a door 20, two first elastic members 30, a holding unit 40, two fixing members 50 and a second elastic member 60.

The housing 10 includes a bottom wall 12 and a peripheral wall 14 perpendicularly extending from the periphery of the bottom 12. The bottom wall 12 forms a holding frame unit 122. The holding frame unit 122 includes spaced-apart, oppositely shaped, parallel holding blocks 124. Each of the two holding blocks 124 is generally L-shaped and includes a top wall 1242 parallel with the bottom wall 12, a sidewall 1244 and an end wall 1246. The sidewall 1244 and the end wall 1246 connect with each other perpendicularly, and perpendicularly connect to the top wall 1242 and the bottom wall 12. The spaced-apart holding blocks 124 and the bottom wall 12 cooperatively enclose a receiving space 1248 defining a first opening 1247 and a second opening 1249. The receiving space 1248 is used to receive the battery 200. The first opening 1247 is defined by the two end walls 1246 and facilitates passing of the second elastic member 60 through for abutting the battery 200. The second opening 1249 is aligned opposite to the first opening 1247 and facilitates inserting of the battery 200 into the receiving space 1248.

The peripheral wall 14 defines a cutout 142. The cutout 142 is aligned with the second opening 1249 and facilitates passing the battery 200 through the cutout 142 and the second opening 1249 into the receiving space 1248. The peripheral wall 14 has a latching portion 144 formed thereon, the latching portion 144 faces the cutout 142, abuts the bottom wall 12, and is used to engage the second elastic member 60. The latching portion 144 includes two L-shaped latching boards 1442, which are symmetrically positioned on the peripheral wall 14 to enclose a gap 1444.

Figure 2:
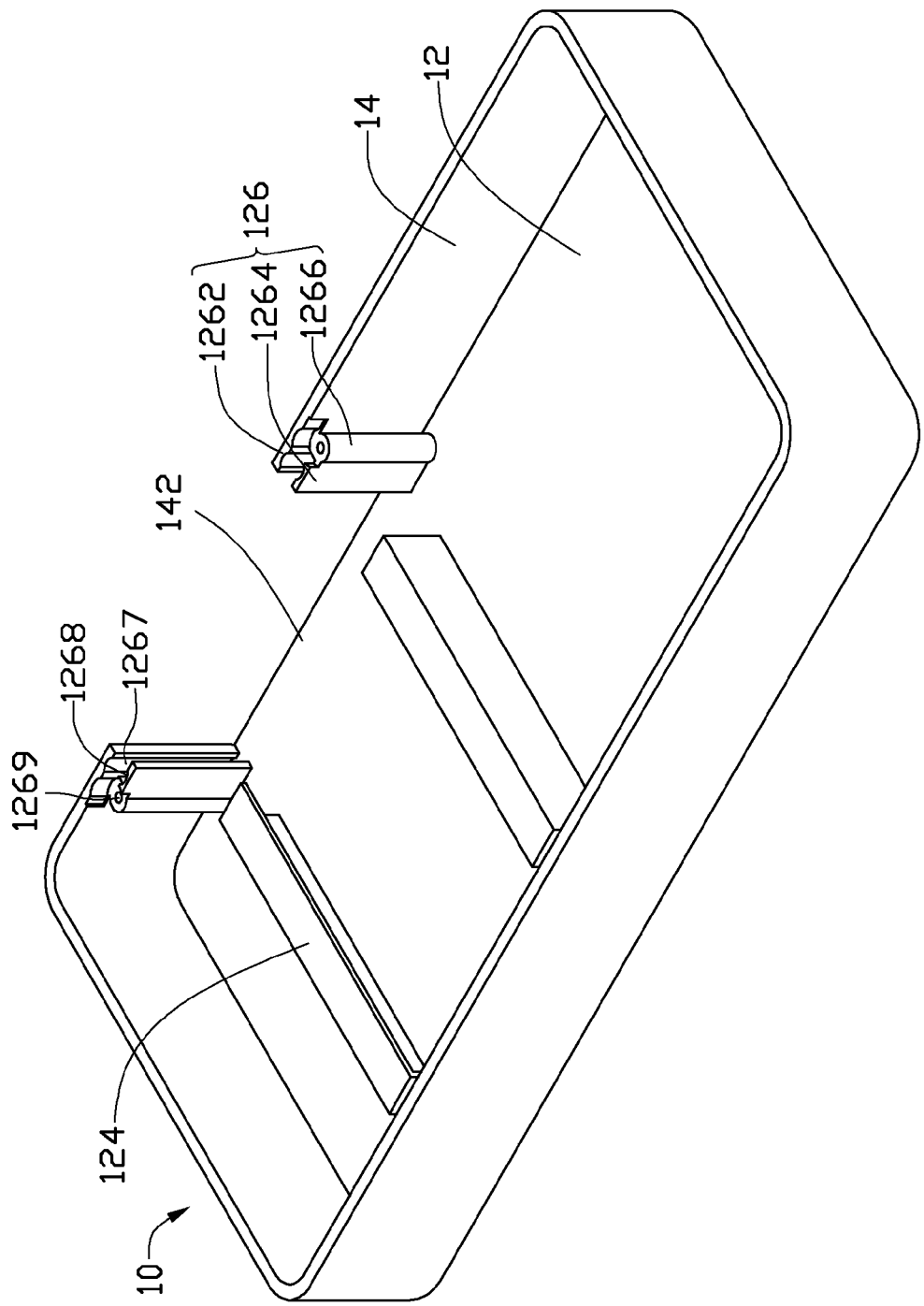
FIG. 2 is a schematic view of the housing of the battery cover mechanism shown in FIG. 1.

Referring to FIG. 2, the bottom wall 12 further includes a latching seat 126 on each side of the cutout 142. The latching seat 126 includes a first latching wall 1262, a second latching wall 1264, and a connecting body 1266. The first latching wall 1262 can be a portion of the peripheral wall 14 adjacent to the cutout 142. The second latching wall 1264 protrudes from the bottom wall 12 and extends in parallel with the first latching wall 1262. The connecting body 1266 is a pole connecting the first latching wall 1262 and the second latching wall 1264. Accordingly, two guiding slots 1267 are enclosed in the two latching seats 126. The guiding slot 1267 is used to engagingly receive the door 20. Each of the two guiding slots 1267 includes a chamber section 1268 for receiving one of the first elastic members 30 therein. The connecting body 1266 defines a first connecting hole 1269 for receiving the fixing member 50.

The door 20 includes a main board 22 and a rib 24 at each side of the main board 22. The main board 22 has a front surface 222 and a back surface (not labeled). The front surface 222 forms a plurality of strips 224 for providing friction when sliding the door 20. The two ribs 24 extend laterally from their respective sides of the back surface. The ribs 24 are used to slidably engage into the guiding slots 1267.

The first elastic member 30 is a coil spring and can be received in the chamber section 1268 of the latching seat 126.

The holding unit 40 is a bar defining two second connecting holes 42 corresponding to the two first connecting holes 1269.

The fixing member 50 can be a screw passed through the second connecting hole 42 and screwed into the first connecting holes 1269 to fix the holding unit 40 to the housing 10. The holding unit 40 encloses the chamber section 1268 so that the first elastic member 30 is resisted by the holding unit 40 to be accommodated in the chamber section 1268.

The second elastic member 60 is a coil spring including a positioning end 62 and a resisting end 64. The positioning end 62 can be secured into the latching portion 144 of the peripheral wall 14 and the resisting end 64 extends through the gap 1444 to resist the battery 200.

To assemble the battery cover mechanism 100, the door 20 is mounted to the housing 10. The two ribs 24 of the door 20 are received in their respective guiding slots 1267 of the two latching seats 126 and positioned into their respective chamber sections 1268. The door 20 closes off the cutout 142 of the housing 10 until the ribs 24 reach to the bottom wall 12. Then, the first elastic members 30 are placed into their respective chamber sections 1268 and the ends of the first elastic members 30 resist their respective ribs 24. The other opposite ends of the first elastic member 30 expose out of the chamber sections 1268. After that, the holding unit 40 is assembled in the housing 10, the two second connecting holes 42 of the holding unit 40 is aligned above the first connecting holes 1269 of the latching seat 126, the two fixing members 50 passed through the second connecting holes 42 and screw into their respective first connecting holes 1269, thereby, fixing the holding unit 40 with the housing 10. The first elastic members 30 are compressed by the pressing of the holding unit 40. The ribs 24 are resisted by the first elastic members 30. Then, the second elastic member 60 is assembled in the housing 10. In this case, the positioning end 62 is secured into the latching portion 144 of the peripheral wall 14, the resisting end 64 out of the gap 1444 passes through the first opening 1247 and enters into the receiving space 1248.

Figure 3:
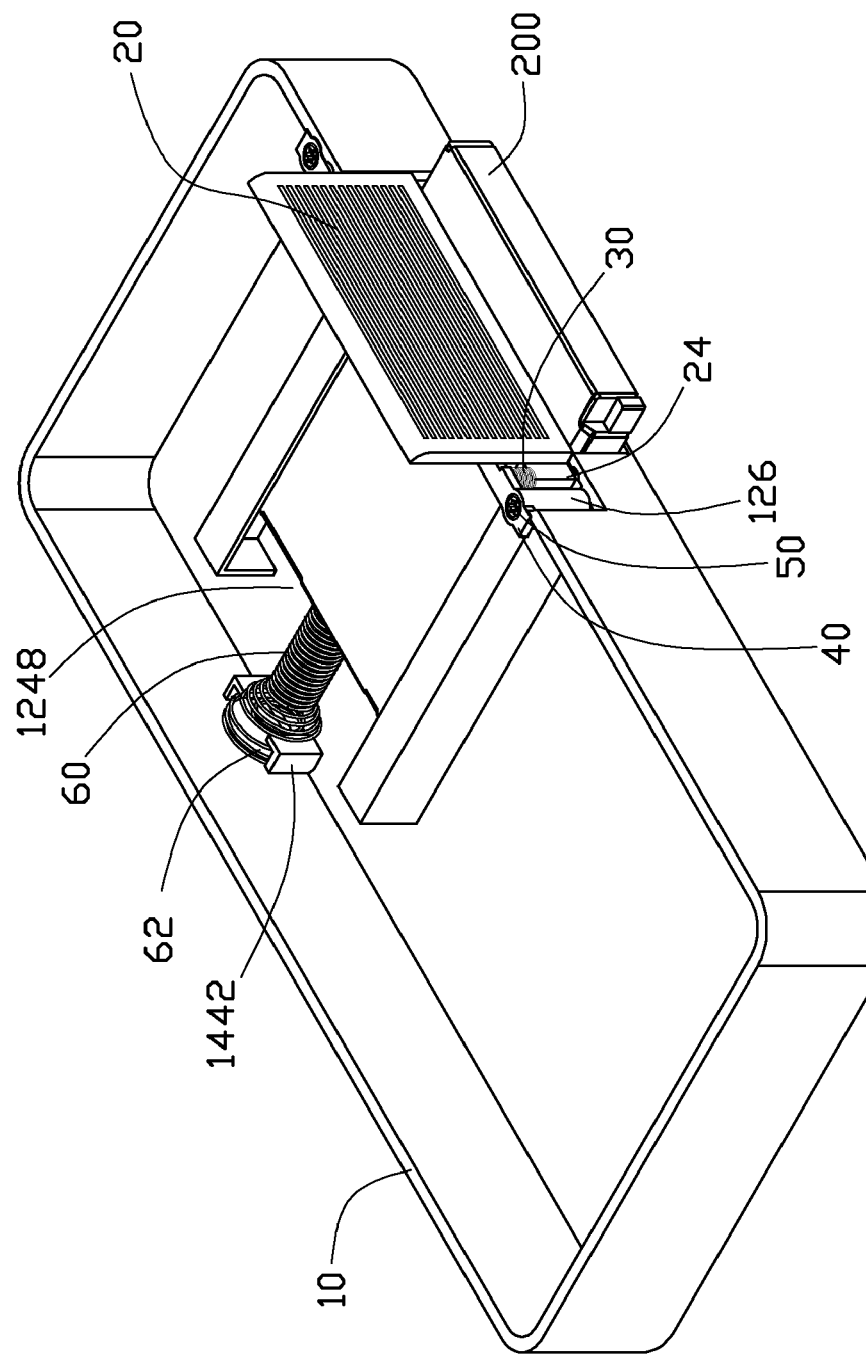
FIG. 3 is a sectional partial schematic view of the battery cover mechanism shown in FIG. 1 in assembly.
Figure 4:
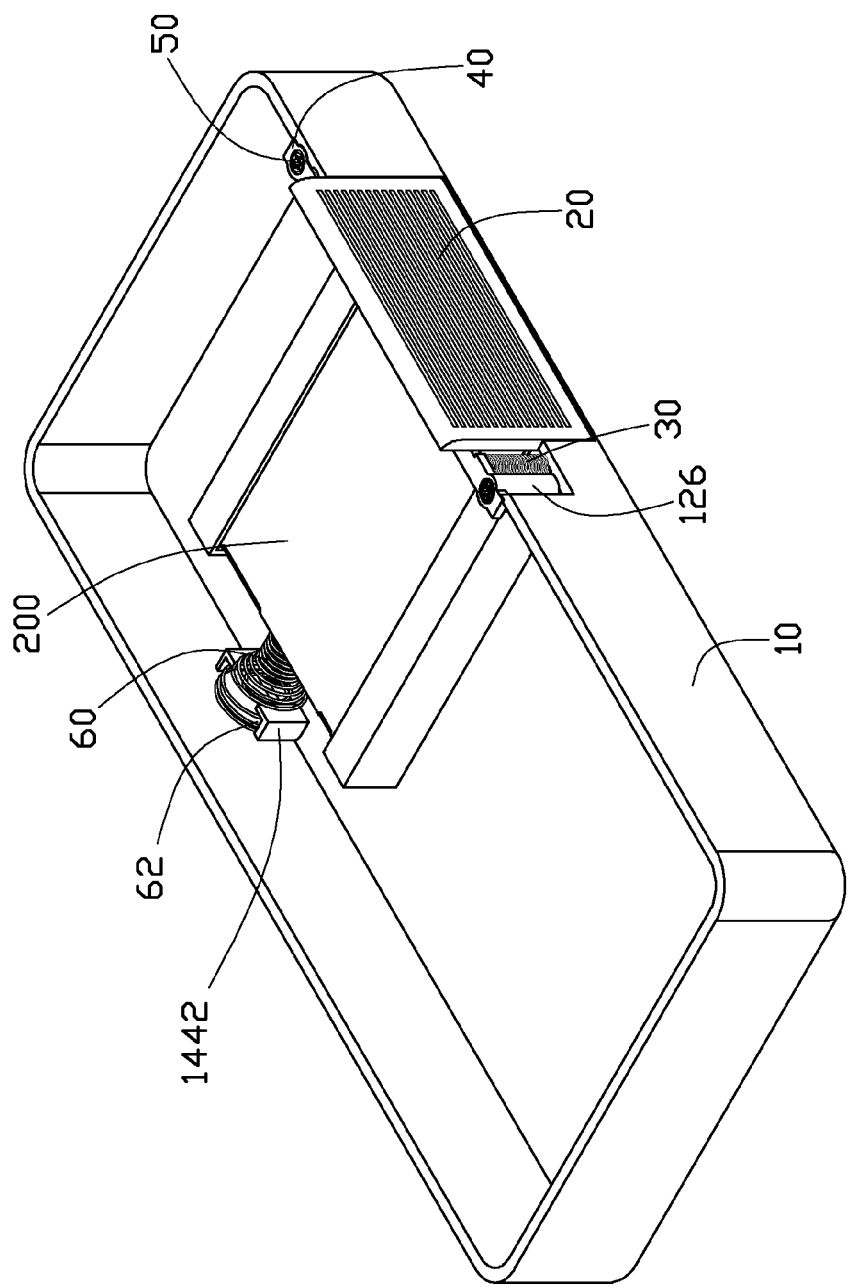
FIG. 4 is a sectional partial and assembled schematic view of the battery cover mechanism shown in FIG. 1.

Referring to FIG. 3 and FIG. 4, to install the battery 200 by the battery cover mechanism 100, the door 20 is slid upwards with an external force away from the bottom of the latching seat 126 to expose the cutout 142. The ribs 24 slide accordingly and the first elastic members 30 are further compressed. The battery 200 can be pushed through the cutout 142 and the second opening 1249 into the receiving space 1248 of the housing 10. The battery 200 resists against and compresses the second elastic member 60 within the receiving space 1248 until the end portions of the battery 200 contact the end walls 1246. Then, the external force is removed from door 20, releasing the door 20 to slide downwardly along the guiding slots 1267 by the first elastic members 30. The cutout 142 is closed off again by the door 20. The battery 200 is latched within the holding frame unit 122 by the door 20 and the second elastic member 60, and thus cannot be removed out of the receiving space 1248. To remove the battery 200, the door 20 is pushed and slides upwardly to expose the cutout 142, the battery 200 can be freed from the receiving space 1248 by expansion of the second elastic member 60. Therefore, it is easy to take out the battery 200 without removing the door 20 entirely from the housing 10, preventing misplacing and losing the door 20.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A battery cover mechanism for a portable electronic device, comprising:
   a housing having a peripheral wall and a bottom wall, wherein the peripheral wall defines a cutout, the bottom wall forms spaced-apart latching seats on opposites sides of the cutout, the two latching seats form spaced-apart guiding slots, each latching seat defines a first connecting hole;
   a door having a rib at each side thereof;
   two first elastic members;
   two fixing members;
   a holding unit defining two second connecting holes corresponding to the two first connecting holes; and
   a second elastic member fixed in the housing and facing the cutout;
   wherein the door engages with the two latching seats to close the cutout, each rib is received in one of the guiding slots, each first elastic member is positioned into one of the guiding slots, each fixing member passes through one of the second connecting holes and one of the first connecting holes to fix the holding unit on the two latching seats, the holding unit encloses the guiding slots and presses the two first elastic members, each first elastic member is resisted between one of the ribs and the holding unit, the second elastic member and the door resist a battery therebetween, the door can slide along the guiding slots to open the cutout, allowing the second elastic member to push the battery out from the cutout
   wherein the fixing member is a screw and screws into the second connecting hole and the first connecting hole.

2. The battery cover mechanism as claimed in claim 1, wherein the latching seat includes a first latching wall, a second latching wall and a connecting body, the first latching wall and the second latching wall are parallel, and the connecting body connects the first latching wall and the second latching wall to enclose the guiding slot, the first connecting hole is defined in the connecting body.

3. The battery cover mechanism as claimed in claim 2, wherein the first latching wall is a portion of the peripheral wall adjacent to the cutout.

4. The battery cover mechanism as claimed in claim 2, wherein the guiding slot includes a chamber section to receive the first elastic member, and the holding unit encloses the chamber section to prevent the first elastic member from exposing out of the chamber section.

5. The battery cover mechanism as claimed in claim 1, wherein the first elastic member is a coil spring.

6. The battery cover mechanism as claimed in claim 1, wherein the door includes a main board and the two ribs laterally extending from the main board.

7. The battery cover mechanism as claimed in claim 1, wherein the bottom wall has a holding frame for holding the battery.

8. The battery cover mechanism as claimed in claim 7, wherein the peripheral wall forms a latching portion to latch the second elastic member.

9. The battery cover mechanism as claimed in claim 8, wherein the latching portion includes two latching boards positioned symmetrically on the peripheral wall and defining a gap for engagement with a portion of the second elastic member.

10. The battery cover mechanism as claimed in claim 8, wherein the holding frame unit is formed by spaced-apart blocks, the two blocks enclose a receiving space, a first opening, and a second opening, the first opening and the second opening align with the cutout, the second elastic member passes through the first opening into the receiving space, the battery can pass through the cutout and the second opening into the receiving space.

11. The battery cover mechanism as claimed in claim 8, wherein the second elastic member is a coil spring and includes a positioning end and a resisting end, the resisting end engaging with the latching portion.

12. A battery cover mechanism for a portable electronic device, comprising:
    a housing having a peripheral wall and a bottom wall, wherein the peripheral wall defines a cutout, the bottom wall forms spaced-apart latching seats at sides of the cutout, the two latching seats form spaced-apart guiding slots, each latching seat defines a first connecting hole;

a door having a rib at each side thereof;
two first elastic members;
two fixing members;
a holding unit defining two second connecting holes corresponding to the two first connecting holes; and
a second elastic member fixed in the housing and facing the cutout;
wherein the door slidably engages with the two latching seats to close the cutout, each rib is received in one of the guiding slots, each first elastic member is positioned into one of the guiding slots, each fixing member passes through one of the second connecting holes and one of the first connecting holes to fix the holding unit on the housing, the holding unit encloses the guiding slots and presses the first elastic members, each of first elastic members is resisted between one of the ribs and the holding unit, the second elastic member engages with the door to resist a battery therebetween, whereby the door can slide along the guiding slots to open the cutout, then the second elastic member pushes the battery out from the cutout
wherein the fixing member is a screw and screws into the second connecting hole and the first connecting hole.

13. The battery cover mechanism as claimed in claim 12, wherein the holding unit is crossed over the latching seats, and is fixed on the top of the two latching seats.

14. The battery cover mechanism as claimed in claim 12, wherein each guiding slot includes a chamber section to receive the first elastic member, and the holding unit encloses the chamber section to prevent the first elastic member from exposing out of the chamber section.

15. The battery cover mechanism as claimed in claim 12, wherein the peripheral wall forms a latching portion including two latching boards that are positioned symmetrically on the peripheral wall and define a gap, the second elastic member is a coil spring and includes a positioning end and a resisting end, the positioning end is latched between the two latching boards, and the resisting end passes through the gap to resist the battery.

* * * * *